US012147029B2

(12) United States Patent
Takahashi et al.

(10) Patent No.: US 12,147,029 B2
(45) Date of Patent: Nov. 19, 2024

(54) ROTARY RECIPROCATING DRIVE ACTUATOR (71) Applicants: Yuki Takahashi, Tokyo (JP);
Masaharu Kagami, Tokyo (JP);
Yasutaka Kitamura, Tokyo (JP); Yuki Otsuka, Tokyo (JP)

(72) Inventors: Yuki Takahashi, Tokyo (JP);
Masaharu Kagami, Tokyo (JP);
Yasutaka Kitamura, Tokyo (JP); Yuki Otsuka, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 477 days.

(21) Appl. No.: 17/673,816

(22) Filed: Feb. 17, 2022

(65) Prior Publication Data

US 2022/0269068 A1 Aug. 25, 2022

(30) Foreign Application Priority Data

Feb. 19, 2021 (JP) .................................. 2021-025491
Feb. 19, 2021 (JP) .................................. 2021-025500

(51) Int. Cl.
G02B 26/08 (2006.01)
G02B 26/10 (2006.01)
H02K 1/34 (2006.01)
H02K 7/08 (2006.01)
H02K 11/22 (2016.01)

(52) U.S. Cl.
CPC ......... *G02B 26/0816* (2013.01); *G02B 26/10* (2013.01); *H02K 1/34* (2013.01); *H02K 7/08* (2013.01); *H02K 11/22* (2016.01)

(58) Field of Classification Search
CPC .. G02B 26/0816; G02B 26/10; G02B 26/105; H02K 1/34; H02K 7/08; H02K 11/22; H02K 33/12; H02K 5/15; H02K 5/1675; H02K 11/0141; H02K 33/16; H02K 7/083; H02K 11/01
See application file for complete search history.

(56) References Cited

U.S. PATENT DOCUMENTS

2021/0184554 A1* 6/2021 Takahashi .............. H02K 33/12
2021/0265904 A1 8/2021 Takahashi et al.

FOREIGN PATENT DOCUMENTS

| JP | 06-284635 | 10/1994 |
| JP | 09-093856 | 4/1997 |
| JP | 4727509 | 4/2011 |

(Continued)

*Primary Examiner* — Euncha P Cherry (57) ABSTRACT

A rotary reciprocating drive actuator capable of increasing the size and amplitude of a movable object such as a mirror, and of stabilizing the drive performance is provided. The rotary reciprocating drive actuator includes a movable part including a rotating shaft, a fixed part supporting the rotating shaft, and a driving part that includes a coil and a core disposed on the fixed part and a magnet disposed on the rotating shaft, and rotates the rotating shaft about the axis thereof with respect to the fixed part by utilizing electromagnetic interaction. The fixed part includes first and second supports disposed so as to face each other with the magnet therebetween in the axial direction. The rotating shaft is rotatably attached to the first and second supports via first and second bearings. One of the first and second bearings is a rolling bearing, and the other is a slide bearing.

18 Claims, 6 Drawing Sheets (56) References Cited

FOREIGN PATENT DOCUMENTS

| JP | 2017-093105 | 5/2017 |
| JP | 2018-194023 | 12/2018 |
| WO | WO 2013/183435 | 12/2013 |
| WO | WO 2020/004514 | 1/2020 |

* cited by examiner

ROTARY RECIPROCATING DRIVE ACTUATOR

This application is entitled to (or claims) the benefit of Japanese Patent Application No. 2021-025491, filed on Feb. 19, 2021 and Japanese Patent Application No. 2021-025500, filed on Feb. 19, 2021, the disclosures of which including the specifications, drawings and abstracts are incorporated herein by reference in their entirety.

TECHNICAL FIELD

The present invention relates to a rotary reciprocating drive actuator.

BACKGROUND ART

As an actuator used in a scanner in a multifunction peripheral, a laser beam printer and other apparatuses, an actuator driven to be rotated in a reciprocating manner (hereinafter referred to as "rotary reciprocating drive actuator") has been known. A rotary reciprocating drive actuator includes, for example, a rotating shaft that is a movable body and a driving part including a coil magnet. Such a rotary reciprocating drive actuator is capable of optical scanning of an object by changing the reflection angle of a laser beam by a mirror attached to a rotating shaft that is driven to rotate in a reciprocating manner by energizing the coil. Examples of such rotary reciprocating drive actuators include moving coil type actuators in which a coil is disposed on a rotating shaft and moving magnet type actuators in which a magnet is disposed on a rotating shaft (see, for example, Patent Literature (hereinafter, referred to as PTL) 1).

CITATION LIST

Patent Literature

PTL 1 Japanese Patent No. 4727509

SUMMARY OF INVENTION

Technical Problem

In a rotary reciprocating drive actuator of the moving coil type, heat generated by the coil during driving (when the coil is energized) may adversely affect, for example, the surface condition of the mirror, the bonding condition of the mirror to the rotating shaft, and the shape of the mirror such as warpage. In addition, it is difficult to increase the current input to the coil in view of the heat generation from the coil during the driving, thereby making it difficult to increase the size and amplitude of the mirror serving as a movable object. Further, it is necessary to pull out the wiring, which extends to the coil disposed on the rotating shaft, to the fixed body side, thereby lowering the assembling property.

On the other hand, a rotary reciprocating drive actuator of the moving magnet type does not suffer the above problems related to the coil heat generation and coil wiring. However, in the structure disclosed in PTL 1, a magnet is disposed in the same area as a mirror is on a rotating shaft, and a yoke around which the coil is wound is disposed so as to surround the magnet; therefore, the mirror, namely a movable object, and the yoke are more likely to interfere with each other when the rotating shaft rotates. This configuration makes the increase of the size and amplitude of the mirror difficult.

An object of the present invention is to provide a rotary reciprocating drive actuator capable of increasing the size and amplitude of a movable object such as a mirror, and of stabilizing the drive performance.

Solution to Problem

A rotary reciprocating drive actuator according to the present invention includes:
  a movable part including a rotating shaft on which a movable object is disposed;
  a fixed part configured to support the rotating shaft; and
  a driving part configured to rotate the rotating shaft about an axis of the rotating shaft with respect to the fixed part by utilizing electromagnetic interaction, the driving part including a coil and a core each disposed on the fixed part, and a magnet disposed on the rotating shaft, in which
  the magnet is a ring-shaped magnet such that an S pole and an N pole are alternately disposed on an outer peripheral surface of the magnet in a circumferential direction of the magnet,
  the core includes one or more magnetic pole parts that are excited to generate a polarity by energizing the coil, and the core is disposed in such a way that the one or more magnetic pole parts face the outer peripheral surface of the magnet via an air gap when the rotating shaft is attached to the fixed part,
  the number of one or more magnetic poles of the magnet is equal to the number of the one or more magnetic pole parts,
  the rotary reciprocating drive actuator further includes a rotation angle position holding part configured to hold a rotation angle position of the rotation shaft at a neutral position by a magnetic attraction force generated between the magnet and the rotation angle position holding part, the rotation angle position holding part being disposed on the fixed part so as to face the magnet via the air gap,
  the fixed part includes a first support and a second support disposed so as to face each other with the magnet therebetween in a direction of the axis,
  the rotating shaft is rotatably attached to the first support via the first bearing and to the second support via the second bearing, and
  one of the first bearing or the second bearing is a rolling bearing, and the other of the first bearing or the second bearing is a slide bearing.

Another rotary reciprocating drive actuator according to the present invention includes:
  a movable part including a rotating shaft on which a movable object is disposed;
  a fixed part configured to support the rotating shaft; and
  a driving part configured to rotate the rotating shaft about an axis of the rotating shaft with respect to the fixed part by utilizing electromagnetic interaction, the driving part including a coil and a core each disposed on the fixed part, and a magnet disposed on the rotating shaft, in which
  the magnet is a ring-shaped magnet such that an S pole and an N pole are alternately disposed on an outer peripheral surface of the magnet in a circumferential direction of the magnet,
  the core includes one or more magnetic pole parts that are excited to generate a polarity by energizing the coil, and the core is disposed in such a way that the one or more magnetic pole parts face the outer peripheral surface of the magnet via an air gap when the rotating shaft is attached to the fixed part, the number of one or more magnetic poles of the magnet is equal to the number of the one or more magnetic pole parts, the rotary reciprocating drive actuator further includes a rotation angle position holding part configured to hold a rotation angle position of the rotation shaft at a neutral position by a magnetic attraction force generated between the magnet and the rotation angle position holding part, the rotation angle position holding part being disposed on the fixed part so as to face the magnet via the air gap, the fixed part includes a first support and a second support disposed so as to face each other with the magnet therebetween in a direction of the axis, and includes a third support disposed so as to face the second support with the movable object therebetween, and the rotating shaft is rotatably supported at three locations that are respectively in the first support, the second support, and the third support.

Advantageous Effects of Invention

The present invention can increase the size and amplitude of a movable object such as a mirror, and also stabilize the drive performance.

DESCRIPTION OF EMBODIMENTS

Hereinafter, one or more embodiments of the present invention will be described with reference to the drawings.

Figure 1:
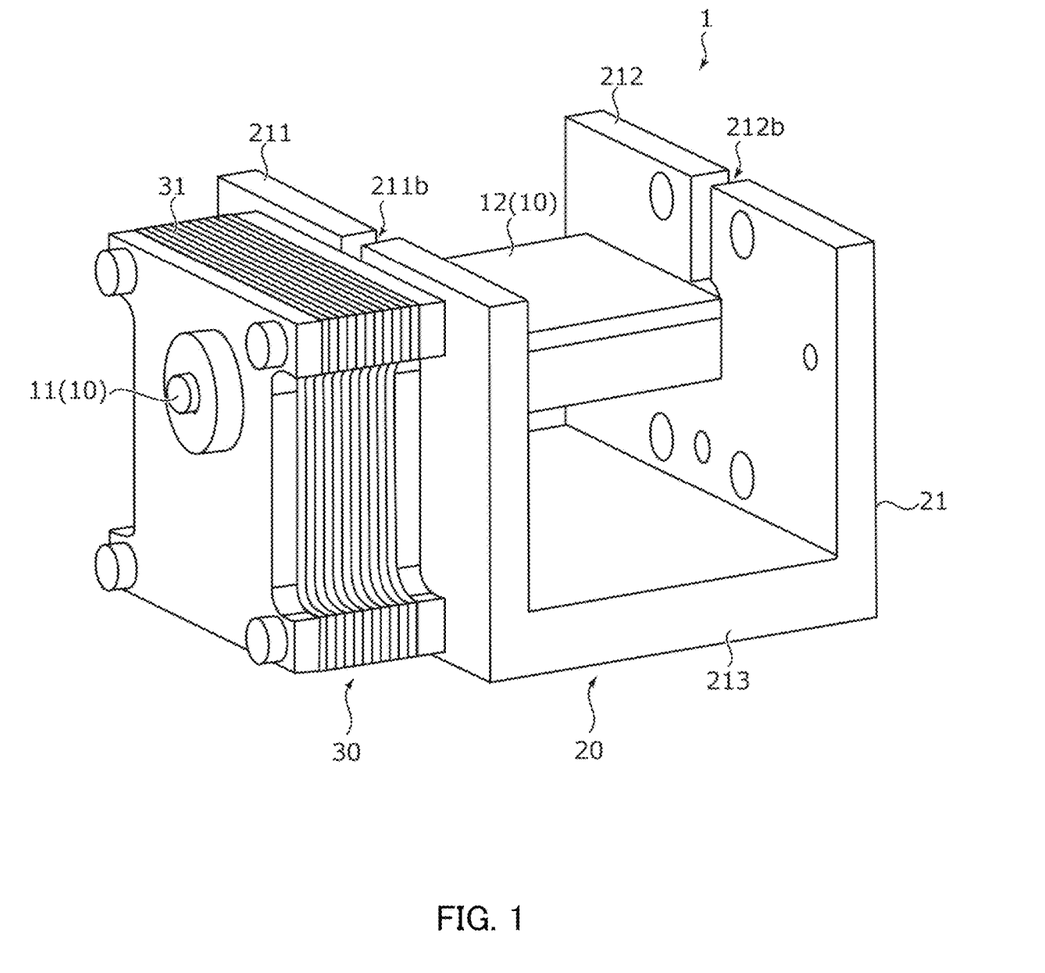
FIG. 1 is an external perspective view of a rotary reciprocating drive actuator of an embodiment.
Figure 2:
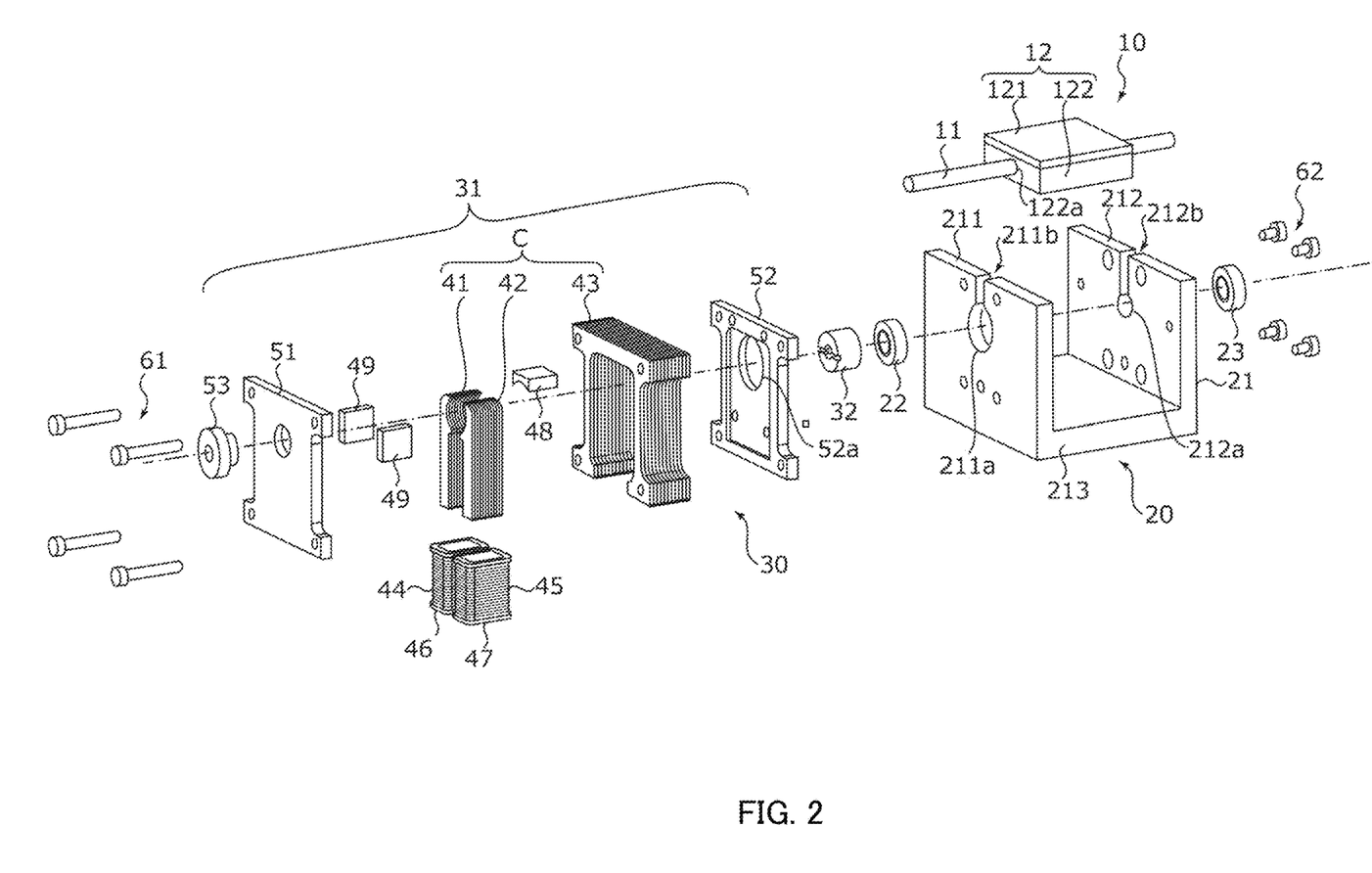
FIG. 2 is an exploded perspective view of the rotary reciprocating drive actuator.
Figure 3:
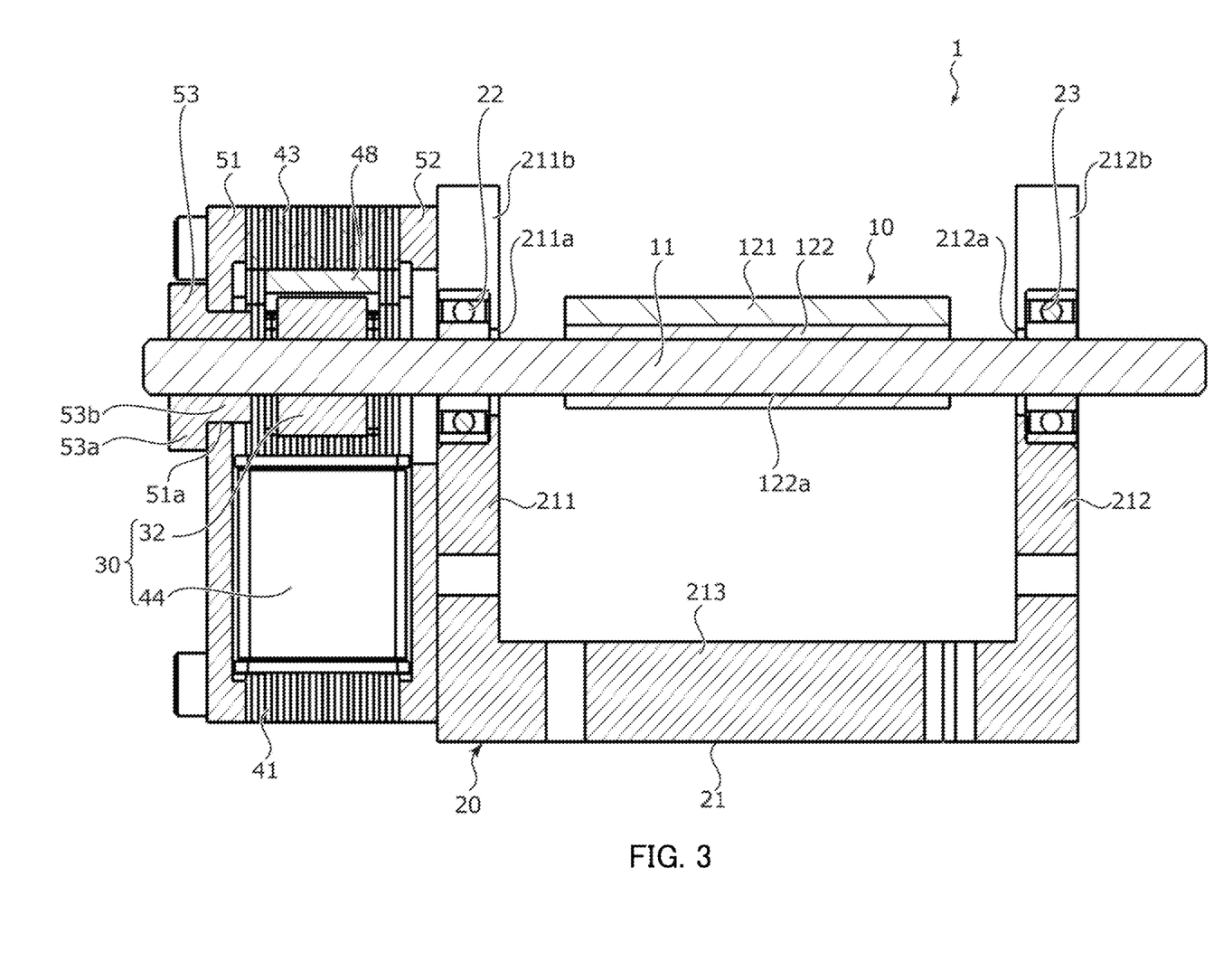
FIG. 3 is a cross-sectional view of the rotary reciprocating drive actuator.

FIG. 1 is an external perspective view of rotary reciprocating drive actuator 1 of an embodiment. FIG. 2 is an exploded perspective view of rotary reciprocating drive actuator 1. FIG. 3 is a cross-sectional view of rotary reciprocating drive actuator 1.

Rotary reciprocating drive actuator 1 is used, for example, in a LIDAR (Laser Imaging Detection and Ranging) device. Rotary reciprocating drive actuator 1 is also applicable to an optical scanning device in a multifunction peripheral, a laser beam printer and other apparatuses.

Rotary reciprocating drive actuator 1 includes, as main parts, movable part 10, fixed part 20 for rotatably supporting movable part 10, and driving part 30 for driving movable part 10 to rotate in a reciprocating manner with respect to fixed part 20. Hereinafter, the direction along the rotation axis of movable part 10 is referred to as "axial direction or direction of the axis."

Movable part 10 includes rotating shaft 11 and mirror part 12.

Mirror part 12 serves as a movable object in rotary reciprocating drive actuator 1, and is attached to rotating shaft 11. Mirror part 12 is formed by, for example, adhering mirror 121 to one surface of mirror holder 122. Rotating shaft 11 is inserted through insertion holes 122a of mirror holder 122 and fastened to mirror holder 122.

Fixed part 20 includes base 21, second bearing 22, and third bearing 23.

Base 21 includes left side wall part 211 and right side wall part 212 disposed so as to face each other. Left side wall part 211 and right side wall part 212 are individually erected at both ends of flat plate-shaped bottom part 213 in the axial direction. In other words, base 21 is formed to have a substantially U-shaped cross section.

Insertion holes 211a and 212a through which rotating shaft 11 is inserted are formed in left side wall part 211 and right side wall part 212, respectively. In left side wall part 211 and right side wall part 212, formed are notched parts 211b and 212b that allow insertion holes 211a and 212a to communicate with the outer edges of left side wall part 211 and right side wall part 212, respectively.

Rotating shaft 11 with mirror part 12 attached thereto is placed into insertion holes 211a and 212a from the outside through notched parts 211b and 212b. Without notched parts 211b and 212b, a complicated assembly operation would be required, for example, inserting rotating shaft 11 through the insertion hole 211a of left side wall part 211, insertion hole 122a of mirror holder 122, and insertion hole 212a of right side wall part 212 in this order, and further fastening rotating shaft 11 with mirror holder 122 while mirror part 12 is disposed between left side wall part 211 and right side wall part 212. On the other hand, as notched parts 211b and 212b are formed in left side wall part 211 and right side wall part 212, rotating shaft 11 to which mirror part 12 is attached in advance can be easily placed into insertion holes 211a and 212a through notched parts 211b and 212b, in the present embodiment.

Second bearing 22 and third bearing 23 are each composed of a rolling bearing (for example, a ball bearing). A rolling bearing has a low coefficient of friction and can smoothly rotate rotating shaft 11, thereby improving the drive performance of rotary reciprocating drive actuator 1.

Second bearing 22 and third bearing 23 are disposed in bearing attaching parts (reference numerals thereof omitted) connected to insertion holes 211a and 212a of left side wall part 211 and right side wall part 212, respectively. Specifically, second bearing 22 and third bearing 23 allows the insertion of rotating shaft 11 from both sides in the axial direction of rotating shaft 11, and after rotating shaft 11 is placed through insertion holes 211a and 212a, second bearing 22 and third bearing 23 are attached to the bearing attaching parts. In this way, rotating shaft 11 is rotatably attached to base 21 via second bearing 22 and third bearing 23.

Driving part 30 includes core unit 31 and magnet 32.

Figure 4:
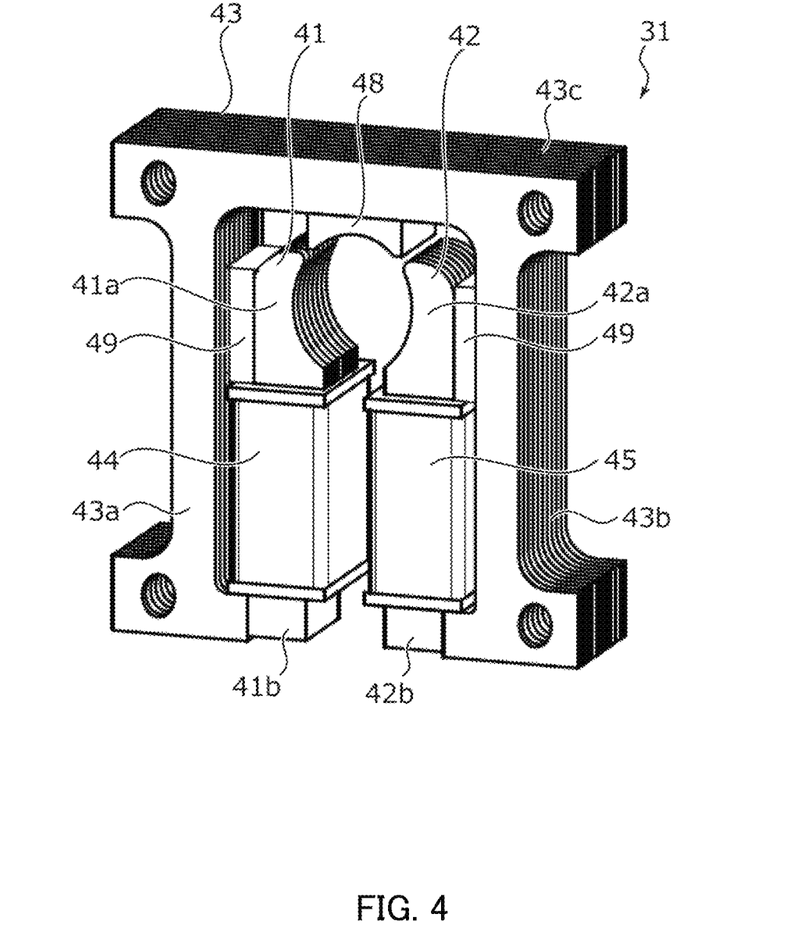
FIG. 4 is a perspective view illustrating the configuration of a core unit.

Core unit 31 includes, for example, first cores 41 and 42, second core (relay core) 43, coils 44 and 45, rotation angle position holding part 48, first shield member 51, second shield member 52, and first bearing 53. FIG. 4 is a perspective view illustrating the configuration of core unit 31 (excluding first shield member 51, second shield member 52, and first bearing 53). In the present embodiment, core unit 31 is formed in a substantially rectangular parallelepiped shape as illustrated in, for example, FIG. 4. Core unit 31 is fastened to base 21 to form a part of fixed part 20.

First cores 41 and 42 and second core 43 are integrated to form one core body C, and form a magnetic circuit when coils 44 and 45 are energized. First cores 41 and 42 and second core 43 are, for example, each composed of laminated core formed by laminating electromagnetic steel sheets such as silicon steel sheets.

First cores 41 and 42 include magnetic pole parts 41a and 42a, and leg parts 41b and 42b extending downward from magnetic pole parts 41a and 42a, respectively. When the magnetic pole part is excited by energizing coil 44 or 45, the magnetic pole part generates a polarity according to the energization direction.

The portions of magnetic pole parts 41a and 42a—the portions facing magnet 32—each have a shape curved along the outer peripheral surface of magnet 32. Coil 44 and 45 are disposed on leg parts 41b and 42b, respectively. First cores 41 and 42 are fixed to second core 43 in a posture such that magnetic pole parts 41a and 42a face each other and leg parts 41b and 42b are parallel to each other.

Second core 43 allows leg parts 41b and 42b of first cores 41 and 42 to communicate to each other, and forms an intermediate portion of a magnetic circuit through which magnetic pole parts 41a and 42a are connected to each other. That is, first cores 41 and 42 are integrally connected to each other via second core 43. In the present embodiment, second core 43 is formed to have a U shape, and the ends of leg parts 41b and 42b of first cores 41 and 42 are connected to the insides of the open ends of leg parts 43a and 43b, respectively. In other words, first cores 41 and 42 are surrounded by second core 43 from three sides (left side, right side and upper side), namely directions orthogonal to rotating shaft 11. The bent portion of second core 43 (the connecting portion between leg part 43a or 43b and bridge part 43c) may have a rounded shape or a linearly bent shape.

In the state where rotary reciprocating drive actuator 1 is assembled, rotating shaft 11 is inserted through the space surrounded by magnetic pole parts 41a and 42a. In addition, magnet 32 attached to rotating shaft 11 is located in this space and faces magnetic pole parts 41a and 42a via an air gap.

In core unit 31, spacers 49 are disposed between magnetic pole part 41a of first core 41 and leg part 43a of second core 43 and between magnetic pole part 42a of first core 42 and leg part 43b of second core 43. Spacers 49 are, for example, fixed to first cores 41 and 42 and second core 43 by adhesion or welding. Spacer 49 is formed of, for example, a non-magnetic material such as brass or aluminum.

Placing spacers 49 between second core 43 and magnetic pole parts 41a and 42a, which include free ends, can increase the rigidity of core unit 31. It is thus possible to prevent deformation or damage of first cores 41 and 42 caused by impact or the magnetic force generated between magnet 32 and core unit 31. Further, by forming spacer 49 with a non-magnetic material, the magnetic flux path in core unit 31 can be regulated.

Coils 44 and 45 are respectively wound around cylindrical bobbins 46 and 47. A coil unit composed of coil 44 and bobbin 46 is disposed outside leg part 41b of first core 41, and a coil unit composed of coil 45 and bobbin 47 is disposed outside leg part 42b of first core 42, thereby disposing coils 44 and 45 so as to wind around leg parts 41b and 42b of first cores 41 and 42, respectively. The winding directions of coils 44 and 45 are set in such a way that magnetic flux is suitably generated from one of magnetic pole parts 41a and 42a of first cores 41 and 42 toward the other magnetic pole part when energization is performed.

In the state where rotary reciprocating drive actuator 1 is assembled, rotation angle position holding part 48 is incorporated into core unit 31 so as to face magnet 32 via an air gap. Rotation angle position holding part 48 is, for example, attached to bridge part 43c (the portion above first cores 41 and 42) of second core 43 in a posture such that the magnetic pole faces magnet 32.

Rotation angle position holding part 48 is composed of, for example, a magnet, and generates a magnetic attraction force between magnet 32 and the rotation angle position holding part. That is, rotation angle position holding part 48, together with first cores 41 and 42, forms a magnetic spring between magnet 32 and the parts. This magnetic spring holds the rotation angle position of magnet 32, that is, the rotation angle position of rotating shaft 11 at the neutral position in the normal state (current is not applied) in which coils 44 and 45 are not energized.

The neutral position is a reference position for the operation of the reciprocating rotation of magnet 32, in other words, the neutral position is the center of swaying. When magnet 32 is held at the neutral position, magnetic pole switching parts 32c and 32d of magnet 32 face (are located at the positions opposite to) magnetic pole parts 41a and 42a of first cores 41 and 42, respectively. The mounting posture of mirror part 12 is adjusted with reference to the state in which magnet 32 is at the neutral position.

First shield member 51 and second shield member 52 each made of an electric conductive material are disposed on both sides of core unit 31 in the axial direction, respectively. First shield member 51 and second shield member 52 can prevent the incident of noise from the outside on core unit 31 and the emission of noise from core unit 31 to the outside.

First shield member 51 and second shield member 52 are preferably formed of an aluminum alloy. An aluminum alloy has a high degree of freedom in design and can easily impart the desired rigidity, and thus is suitably used for first shield member 51 which is to function as a support for supporting rotating shaft 11.

Rotating shaft 11 is rotatably attached to first shield member 51 via first bearing 53. First bearing 53 is disposed at bearing attaching part 51a formed on the first shield member 51. First bearing 53 includes cylindrical body part 53b through which rotating shaft 11 is inserted, and flange part 53a disposed at one end of body part 53b. Body part 53b of first bearing 53 is fitted into bearing attaching part 51a of first shield member 51, and flange part 53a is locked to the outer surface of first shield member 51. After rotating shaft 11 is inserted through bearing attaching part 51a of first shield member 51, first bearing 53 is inserted into bearing attaching part 51a from the side where rotating shaft 11 protrudes from first shield member 51, and fitted into bearing attaching part 51a. In this way, the end portion of rotating shaft 11 on the side where magnet 32 is to be disposed can be easily attached to first shield member 51.

First bearing 53 is composed of, for example, a slide bearing. Specifically, first bearing 53 is preferably a resin molded product such as a fluororesin. First bearing 53 composed of a slide bearing can function as a damping part, thereby preventing the driving sound (resonant sound of movable part 10). Further, first bearing 53 as a resin molded product can be produced with high degree of freedom in shape and at low cost. In particular, a fluororesin molded product as first bearing 53 can prevent expansion and contraction caused by the environmental temperature, and thus is suitable for using rotary reciprocating drive actuator 1 in a high temperature environment. In addition, a fluororesin molded product has high processing accuracy and can obtain appropriate sliding property. Such a fluororesin molded product can stably support rotating shaft 11 without interfering with the operation of the reciprocating rotation of rotating shaft 11, and is thus suitable as a bearing.

Second shield member 52 includes insertion hole 52a, which is larger than the outer shape of magnet 32. Rotating shaft 11 with magnet 32 mounted thereon is inserted into core unit 31 via insertion hole 52a of second shield member 52.

Core body C composed of first cores 41 and 42 and second core 43 is held between first shield member 51 and second shield member 52, and fixed by fastener 61 to be integrated into core unit 31. Further, core unit 31 is fixed to left side wall part 211 of base 21 by fastener 62 and integrated with base 21.

Magnet 32 is a ring-shaped magnet in which at least one S pole 32a and at least one N pole 32b are alternately disposed in the circumferential direction. In the state where rotary reciprocating drive actuator 1 is assembled, magnet 32 is attached to the peripheral surface of rotating shaft 11 so as to be located in the space surrounded by magnetic pole parts 41a and 42a of core unit 31. When coils 44 and 45 are energized, first cores 41 and 42 and second core 43 are excited to generate polarities in magnetic pole parts 41a and 42a according to the energization direction, thereby generating magnetic force (attraction force and repulsion force) between magnet 32 and magnetic pole parts 41a and 42a.

In the present embodiment, magnet 32 is magnetized to have different polarities with a plane along the axial direction of rotating shaft 11 as a boundary. That is, magnet 32 is a two-pole magnet magnetized so as to be equally divided into S pole 32a and N pole 32b. The number of magnetic poles of magnet 32 (two in the present embodiment) is equal to the number of magnetic pole parts 41a and 42a of core unit 31. Magnet 32 may be magnetized to have two or more poles depending on the amplitude during movement. In this case, magnetic pole parts of core unit 31 are provided according to the magnetic poles of magnet 32.

The polarity of magnet 32 is switched at boundary portions (hereinafter, referred to as "magnetic pole switching part") 32c and 32d between S pole 32a and N pole 32b. Magnetic pole switching parts 32c and 32d respectively face magnetic pole parts 41a and 42a when magnet 32 is held at the neutral position.

As magnetic pole switching parts 32c and 32d of magnet 32 face magnetic pole parts 41a and 42a at the neutral position, driving part 30 can generate the maximum torque to stably drive movable part 10. In addition, configuring magnet 32 with a two-pole magnet improves the driving of a movable object with a high amplitude in cooperation with core unit 31, and also improves the drive performance. The embodiment describes magnet 32 including a pair of magnetic pole switching parts 32c and 32d, but magnet 32 may include two or more pairs of magnetic pole switching parts.

Rotating shaft 11 with mirror part 12 and magnet 32 mounted thereto is fixed to base 21 via second bearing 22 and third bearing 23. Mirror part 12 is located in the space between left side wall part 211 and right side wall part 212 of base 21, and magnet 32 is located outside (on the left side of) left side wall part 211 of base 21.

The portion of rotating shaft 11 which is exposed from left side wall part 211 (the portion where magnet 32 is disposed) is inserted into core unit 31 in the axial direction, and fixed to first shield member 51 via first bearing 53. Magnet 32 is located inside core unit 31, that is, in the space between first shield member 51 and left side wall part 211 of base 21.

In the state where rotary reciprocating drive actuator 1 is assembled, the portion of rotating shaft 11 where mirror part 12 is disposed is supported at two points, i.e., by left side wall part 211 and right side wall part 212. Therefore, the support strength for rotating shaft 11 is higher than that for a rotating shaft supported only by left side wall part 211 (i.e., cantilevered), and thus the linearity of rotating shaft 11 can be maintained even when the size and weight of mirror part 12 increase.

In addition, the portion of rotating shaft 11 where magnet 32 is disposed is supported at two points, i.e., by first shield member 51 and left side wall part 211, and thus the linearity of rotating shaft 11 can be maintained even when magnetic attraction force between magnet 32 and rotation angle position holding part 48 increases. In other words, when the portion of rotating shaft 11 where magnet 32 is disposed is supported only by left side wall part 211 to be cantilevered, rotating shaft 11 may bend toward rotation angle position holding part 48, thereby disadvantageously reducing the linearity of the rotating shaft as the magnetic attraction force between magnet 32 and rotation angle position holding part 48 increases. However, such a problem does not occur in the present invention.

Figure 5A:
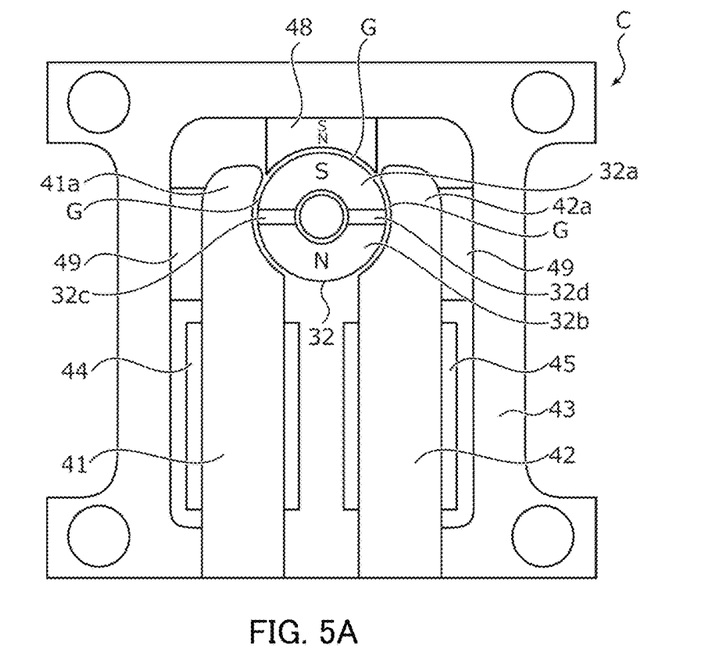
FIGS. 5A and 5B are diagrams for explaining the operation of the magnetic circuit of the rotary reciprocating drive actuator.
Figure 5B:
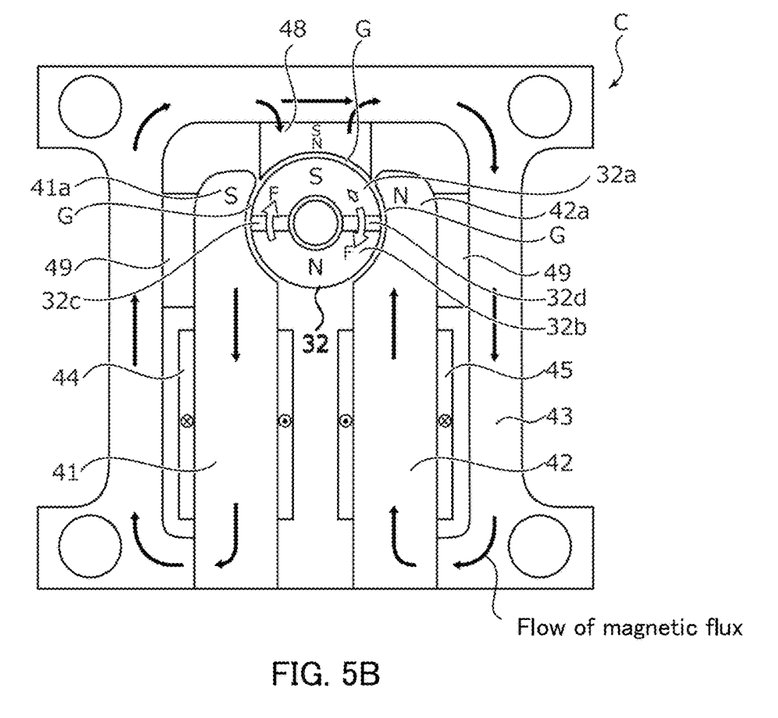

In the following, the operation of rotary reciprocating drive actuator 1 will be described with reference to FIGS. 5A and 5B. FIGS. 5A and 5B are diagrams for explaining the operation of the magnetic circuit of rotary reciprocating drive actuator 1.

Two magnetic pole parts 41a and 42a of core body C are disposed in such a way that magnet 32 is located between magnetic pole parts 41a and 42a via air gap G. As illustrated in FIG. 5A, when the coils 44 and 45 are not energized, magnet 32 is held at a neutral position by a magnetic attraction force between magnet 32 and rotation angle position holding part 48.

At this neutral position, one of S pole 32a and N pole 32b of magnet 32 (S pole 32a in FIG. 5A) is attracted to rotation angle position holding part 48. At this time, magnetic pole switching parts 32c and 32d individually face the center positions of magnetic pole parts 41a and 42a of core body C.

When coils 44 and 45 are energized, core body C is excited, and polarities according to the energization direction are generated in magnetic pole parts 41a and 42a. As illustrated in FIG. 5B, when coils 44 and 45 are energized, magnetic fluxes are generated inside core body C, and magnetic pole part 41a becomes the S pole and magnetic pole part 42a becomes the N pole. As a result, magnetic pole part 41a magnetized to the S pole attracts N pole 32b of magnet 32, and magnetic pole part 42a magnetized to the N pole attracts S pole 32a of magnet 32, thereby generating torque in magnet 32 about the axis of rotating shaft 11 in the F direction to rotate magnet 32 in the F direction. Along with this rotation, rotating shaft 11 also rotates in the F direction, and mirror part 12 fixed to rotating shaft 11 also rotates in the F direction.

On the other hand, when coils 44 and 45 are energized in the direction opposite to that in FIG. 5B, magnetic fluxes are generated inside core body C, and magnetic pole part 41a becomes the N pole and magnetic pole part 42a becomes the S pole (although not illustrated). As a result, magnetic pole part 41a magnetized to the N pole attracts S pole 32b of magnet 32, and magnetic pole part 42a magnetized to the S pole attracts N pole 32a of magnet 32, thereby generating torque in magnet 32 about the axis of rotating shaft 11 in the direction opposite to the F direction to rotate magnet 32 in the —F direction. Along with this rotation, rotating shaft 11 also rotates, and mirror part 12 fixed to rotating shaft 11 also rotates.

Rotary reciprocating drive actuator 1 drives mirror part 12 to rotate in a reciprocating manner by repeating the above operations.

Figure 6:
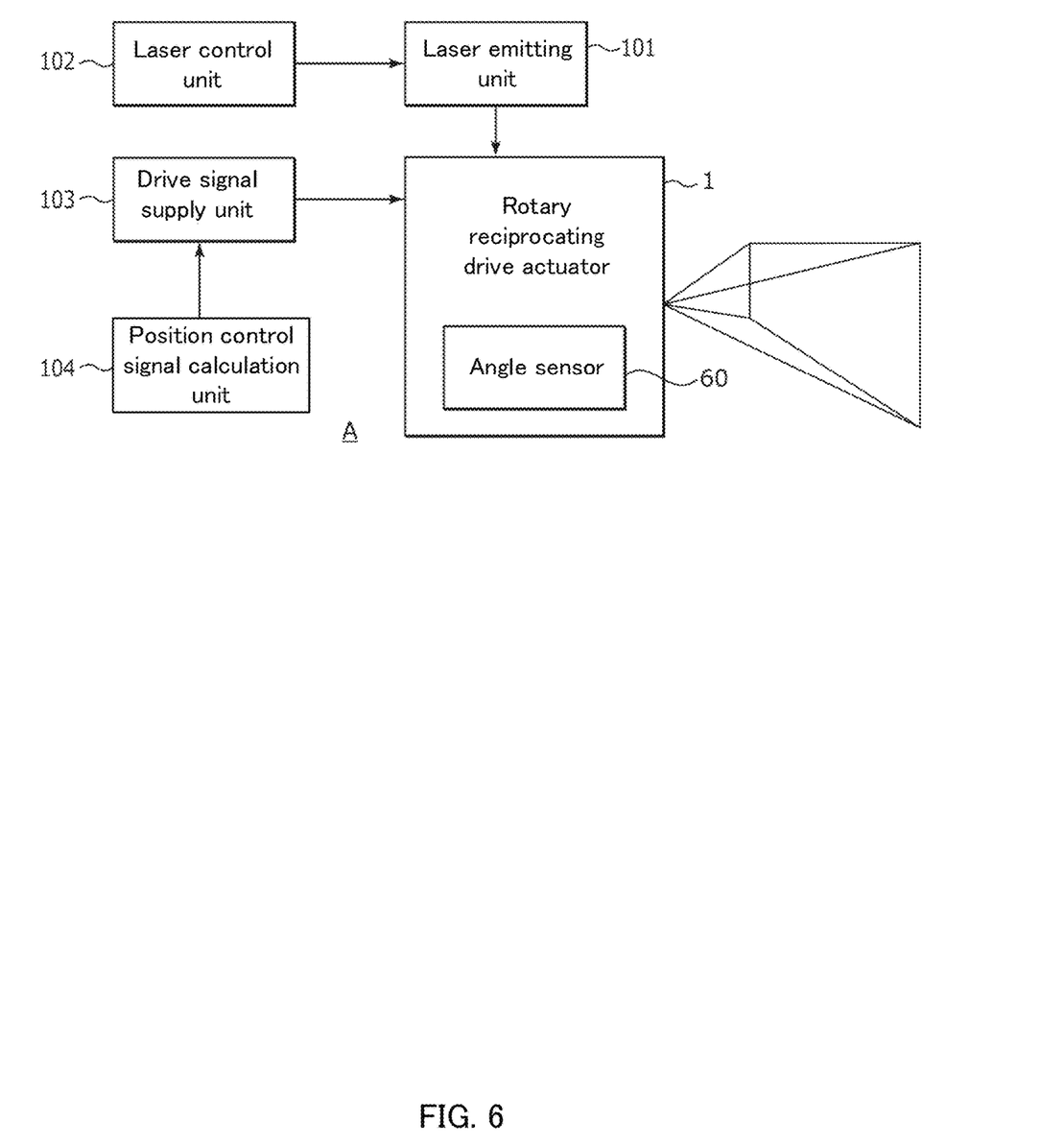
FIG. 6 is a block diagram illustrating the configuration of main parts of an optical scanning device including the rotary reciprocating drive actuator.

In practice, rotary reciprocating drive actuator 1 is driven by an alternating current wave input from a power supply unit (for example, corresponding to drive signal supply unit 103 in FIG. 6) to coils 44 and 45. That is, the energization directions of coils 44 and 45 are periodically switched. When the energization direction is switched, the magnetic attraction force between rotation angle position holding part 48 and magnet 32, namely the restoring force of the magnetic spring, urges magnet 32 to return to its neutral position. Therefore, the torque in the F direction and the torque in the direction opposite to the F direction (—F direction) alternately act on movable part 10 about the axis. Movable part 10 is thus driven to rotate in a reciprocating manner.

In the following, the driving principle of rotary reciprocating drive actuator 1 will be briefly described. In rotary reciprocating drive actuator 1 of the present embodiment, when the moment of inertia of a movable body (movable part 10) is J [kg·m$^2$] and the spring constant in the torsional direction of a magnetic spring (magnetic pole parts 41$a$ and 42$a$, rotation angle position holding part 48, and magnet 32) is K$_{sp}$, the movable body vibrates (rotates in a reciprocating manner) with respect to a fixed body (fixed part 20) at a resonance frequency F$_r$ [Hz] calculated by the equation 1.

$$F_r = \frac{1}{2\pi}\sqrt{\frac{K_{sp}}{J}} \qquad \text{(Equation 1)}$$

F$_r$: Resonance frequency [Hz]

J: Moment of inertia [kg·m$^2$]

K$_{sp}$: Spring constant [N·m/rad]

Since the movable body constitutes a mass portion in a vibration model of a spring-mass system, when an alternating current wave having a frequency equal to the resonance frequency F$_r$ of the movable body is input to coils 44 and 45, the movable body enters a resonance state. That is, by inputting the alternating current wave having a frequency substantially equal to the resonance frequency F$_r$ of the movable body to coils 44 and 45 from a power supply unit, the movable body can be efficiently vibrated.

A motion equation and a circuit equation showing the driving principle of rotary reciprocating drive actuator 1 are shown below. Rotary reciprocating drive actuator 1 is driven based on the motion equation expressed by the equation 2 and the circuit equation expressed by the equation 3.

$$J\frac{d^2\theta(t)}{dt^2} = K_t i(t) - K_{sp}\theta(t) - D\frac{d\theta(t)}{dt} - T_{Loss} \qquad \text{(Equation 2)}$$

J: Moment of inertia [kg·m$^2$]

θ(t): Rotation angle [rad]

K$_t$: Torque constant [N·m/A]

i(t): Current [A]

K$_{sp}$: Spring constant [N·m/rad]

-continued

D: Damping coefficient [N·m/(rad/s)]

T$_{Loss}$: Load torque [N·m]

$$e(t) = Ri(t) + L\frac{di(t)}{dt} + K_e\frac{d\theta(t)}{dt} \qquad \text{(Equation 3)}$$

e(t): Voltage[V]

R: Resistance[Ω]

L: Inductance [H]

K$_e$: Counter electromotive force constant [V/(rad/s)]

That is, the moment of inertia J [kg m$^2$] of the movable body, the rotation angle θ(t) [rad], the torque constant K$_t$ [N·m/A], the current i(t) [A], the spring constant K$_{sp}$ [N m/rad], the damping coefficient D [N m/(rad/s)], the load torque T$_{Loss}$ [N m], and the like in rotary reciprocating drive actuator 1 can be appropriately changed within the range satisfying the equation 2. Further, the voltage e(t) [V], the resistance R [Ω], the inductance L [H], and the counter electromotive force constant K$_e$ [V/(rad/s)] can be appropriately changed within the range satisfying the equation 3.

Thus, rotary reciprocating drive actuator 1 can obtain an efficient and large vibration output when the coil is energized by the alternating current wave corresponding to the resonance frequency F$_r$ determined by the moment of inertia J of the movable body and the spring constant K$_{sp}$ of the magnetic spring.

Rotary reciprocating drive actuator 1 may include angle sensor 60 (see FIG. 6) for detecting the rotation angle of rotating shaft 11. Angle sensor 60 is fixed to, for example, right side wall part 212 of base 21.

Angle sensor 60 includes, for example, an optical sensor and an encoder disk. The encoder disk is attached to rotating shaft 11 and rotates integrally with magnet 32 and mirror part 12. In other words, the rotation position of the encoder disk is the same as the rotation position of rotating shaft 11. The optical sensor emits light to the encoder disk and detects the rotation position (angle) of the encoder disk based on the reflected light, thereby detecting the rotation positions of magnet 32 and mirror part 12.

Providing angle sensor 60 enables detection of the rotation angle of movable part 10 including magnet 32 and rotating shaft 11. It is thus possible to control a rotation angle position and a speed of a movable body, specifically mirror part 12 serving as the movable object, during driving.

FIG. 6 is a block diagram illustrating the configuration of main parts of an optical scanning device including rotary reciprocating drive actuator 1.

Optical scanning device A includes laser emitting unit 101, laser control unit 102, drive signal supply unit 103, and position control signal calculation unit 104, in addition to rotary reciprocating drive actuator 1.

Laser emitting unit 101 includes, for example, a laser diode (LD) serving as a light source and a lens system for converging a laser beam output from the light source. Laser control unit 102 controls laser emitting unit 101. The laser beam emitted from laser emitting unit 101 is incident on mirror 121 of rotary reciprocating drive actuator 1.

Position control signal calculation unit 104 generates and outputs a drive signal for controlling rotating shaft 11 (mirror 121) to be at a target angle position by referring to the angle position of rotating shaft 11 (mirror 121) acquired by angle sensor 60 and the target angle position. For example, position control signal calculation unit 104 generates a position control signal based on the obtained angle position of rotating shaft 11 (mirror 121) and a signal indicating the target angular position converted by using sawtooth waveform data, and the like stored in a waveform memory (not illustrated), and outputs the position control signal to drive signal supply unit 103.

Drive signal supply unit 103 supplies a drive signal to coils 44 and 45 of rotary reciprocating drive actuator 1 based on the position control signal in such a way that rotating shaft 11 (mirror 121) is rotated to be at a desired angle position. As a result, optical scanning device A can emit scanning light from rotary reciprocating drive actuator 1 to a predetermined scanning region.

Rotary reciprocating drive actuator 1 according to the present embodiment has the following features.

Rotary reciprocating drive actuator 1 includes movable part 10 including rotating shaft 11 on which mirror part 12 (movable object) is to be disposed; fixed part 20 configured to support rotating shaft 11; and driving part 30 configured to rotate rotating shaft 11 about an axis of rotating shaft 11 with respect to fixed part 20 by utilizing electromagnetic interaction, driving part 30 including coils 44 and 45 and cores 41 to 43 to be disposed at fixed part 20, and magnet 32 to be disposed on rotating shaft 11.

Magnet 32 is a ring-shaped magnet such that at least one S pole 32a and at least one N pole 32b are alternately disposed on the outer peripheral surface of the magnet in the circumferential direction of the magnet; cores 41 to 43 include magnetic pole parts 41a and 42a that are excited to generate polarities by energizing coils 44 and 45, and cores 41 and 42 are disposed in such a way that magnetic pole parts 41a and 42a face the outer peripheral surface of magnet 32 via air gap G when rotating shaft 11 is attached to fixed part 20; the number of magnetic poles of magnet 32 is equal to the number of magnetic pole parts 41a and 42a; and rotary reciprocating drive actuator 1 further includes rotation angle position holding part 48 configured to hold the rotation angle position of rotating shaft 11 at a neutral position by a magnetic attraction force generated between magnet 32 and rotation angle position holding part 48, and rotation angle position holding part 48 is disposed on fixed part 20 so as to face magnet 32 via air gap G.

As a result, each time the energization direction of coils 44 and 45 is switched, magnet 32 is magnetically attracted to rotation angle position holding part 48 and urged to return to its neutral position (reference position for the operation). Rotary reciprocating drive with improved energy efficiency and responsiveness and high amplitude thus can be achieved. In addition, the heat generated by the coil is less likely to be transmitted to a movable object as compared to a rotary reciprocating drive actuator of the moving coil type; therefore, when the movable object is a mirror, it is possible to avoid adverse effects caused by heat (for example, bond deterioration and warpage) on the mirror.

In addition, fixed part 20 includes first shield member 51 (first support) and left side wall part 211 (second support) of base 21 which are disposed so as to face each other with magnet 32 therebetween in the axial direction; rotating shaft 11 is rotatably attached to first shield member 51 via first bearing 53 and to left side wall part 211 via second bearing 22; and one of first bearing 53 and second bearing 22 is a rolling bearing, and the other of first bearing 53 and second bearing 22 is a slide bearing.

In the present embodiment, first bearing 53 is a slide bearing, and second bearing 22 is a rolling bearing.

As the portion of rotating shaft 11 where magnet 32 is disposed is supported by first shield member 51 and left side wall part 211, the linearity of rotating shaft 11 can be maintained even when the magnetic attraction force between magnet 32 and rotation angle position holding part 48 increases. In other words, when the portion of rotating shaft 11 where magnet 32 is disposed is supported only by left side wall part 211 to be cantilevered, rotating shaft 11 may bend toward rotation angle position holding part 48 to reduce the linearity of the rotating shaft as the magnetic attraction force between magnet 32 and rotation angle position holding part 48 increases; however, such a problem does not occur in the present invention.

It is thus possible to increase the size of magnet 32 to increase the drive torque, thereby successfully increasing the size of a movable object, as well as increasing the amplitude of the movable object by increasing the diameter of magnet 32. In addition, the linearity of rotating shaft 11 can be maintained and thus the drive performance can be stabilized.

A slide bearing serving as first bearing 53 can function as a damping part, thereby preventing the driving sound (resonant sound of movable part 10). Alternatively, first bearing 53 may be composed of a rolling bearing, second bearing 22 may be composed of a slide bearing, and second bearing 22 may function as a damping part.

First bearing 53 includes cylindrical body part 53b through which rotating shaft 11 is inserted, and flange part 53a disposed at one end of body part 53b. Body part 53b is fitted into bearing attaching part 51a formed in first shield member 51 (first support), and flange part 53a is locked to the outer surface of first shield member 51. As a result, the end portion of rotating shaft 11 on the side where magnet 32 is disposed can be easily attached to first shield member 51.

In addition, first bearing 53 is a resin molded product. A resin molded product serving as first bearing 53 can be produced with high degree of freedom in shape and at low cost.

Further, first bearing 53 is formed of a fluororesin. This configuration can prevent expansion and contraction of first bearing 53 caused by the environmental temperature, and thus high processing accuracy and appropriate sliding property can be obtained. Therefore, rotary reciprocating drive actuator 1 can be used in a high temperature environment, and can stably support rotating shaft 11 without interfering with the operation of the reciprocating rotation, thereby improving reliability.

In addition, magnet 32 is a two-pole magnet, and two magnetic pole switching parts 32c and 32d of magnet 32 face magnetic pole parts 41a and 42a when magnet 32 is held at the neutral position. This configuration allows magnet 32, that is, a movable body including rotating shaft 11, to move in a reciprocating manner from the neutral position within the same angle range in one direction and the opposite direction about the axis.

First shield member 51 and second shield member 52 each made of an electric conductive material are disposed on both sides of core unit 31—which includes cores 41 to 43 and coils 44 and 45—in the axial direction. This configuration can prevent the incident of noise from the outside on core unit 31 and the emission of noise from core unit 31 to the outside, thereby improving the reliability of rotary reciprocating drive actuator 1.

Only one of first shield member 51 and second shield member 52 may be provided, and for example, second shield member 52 may not be disposed.

First support is composed of first shield member 51. In other words, first shield member 51 functions as a shield that prevents noise into and out of core unit 31 and also functions as a support that supports rotating shaft 11. As a result, the number of parts can be reduced and space can be saved. Alternatively, a support for supporting rotating shaft 11 may be provided separately from first shield member 51.

First shield member 51 is formed of an aluminum alloy. As a result, the degree of freedom in design increases and sufficient rigidity can be imparted, so that first shield member 51 can function as a support for movable part 10.

The movable object is mirror 121 that reflects scanning light. This configuration allows the use of rotary reciprocating drive actuator 1 as a scanner for optical scanning.

Rotary reciprocating drive actuator 1 according to the present embodiment also has the following features.

In rotary reciprocating drive actuator 1, fixed part 20 includes first shield member 51 (first support) and left side wall part 211 (second support) of base 21 which are disposed so as to face each other with magnet 32 therebetween in the axial direction, and includes right side wall part 212 (third support) disposed so as to face left side wall part 211 with mirror part 12 (movable object) therebetween; and rotating shaft 11 is rotatably supported at three locations, i.e., by first shield member 51, left side wall part 211, and right side wall part 212.

As the portion of rotating shaft 11 where magnet 32 is disposed is supported at two points, i.e., by first shield member 51 and left side wall part 211, the linearity of rotating shaft 11 can be maintained even when the magnetic attraction force between magnet 32 and rotation angle position holding part 48 increases. In addition, the portion of rotating shaft 11 where mirror part 12 is disposed is supported at two points, i.e., by left side wall part 211 and right side wall part 212, thereby maintaining the linearity of rotating shaft 11 even when the size and weight of mirror part 12 increase.

It is thus possible to increase the size of magnet 32 to increase the drive torque, thereby successfully increasing the size of a movable object, as well as increasing the amplitude of the movable object by increasing the diameter of magnet 32. In addition, the linearity of rotating shaft 11 can be maintained and thus the drive performance can be stabilized.

Further, rotating shaft 11 is rotatably attached to first shield member 51 (first support) via first bearing 53, to left side wall part 211 (second support) via second bearing 22 of base 21, and to right side wall part 212 (third support) of base 21 via third bearing 23; and first bearing 53 is a slide bearing, and second bearing 22 and third bearing 23 each are a rolling bearing. As second bearing 22 and third bearing 23 each are rolling bearings, rotating shaft 11 on which the movable object is mounted can be stably held by two rolling bearings, thereby improving the reliability of the durability of rotary reciprocating drive actuator 1. In addition, a slide bearing serving as first bearing 53 can function as a damping part, thereby preventing the driving sound (resonant sound of movable part 10). From the viewpoint of stability of drive performance, first bearing 53, second bearing 22, and third bearing 23 may all be rolling bearings.

While the invention made by the present inventors has been specifically described based on the preferred embodiments, it is not intended to limit the present invention to the above-mentioned preferred embodiments but the present invention may be further modified within the scope and spirit of the invention defined by the appended claims.

For example, mirror part 12 serves as a movable object in the embodiment; however, the movable object is not limited thereto. The movable object may be, for example, an image capturing device such as a camera.

Further, for example, rotary reciprocating drive actuator 1 is driven by resonance in the embodiment, but the present invention can also be applied to the drive by non-resonance.

The configuration of driving part 30 is also not limited to that described in the embodiment. For example, it is sufficient as a core when the core includes a magnetic pole part that is excited and polarized by energizing a coil, and the magnetic pole part and the outer peripheral surface of a magnet face each other via an air gap when a rotating shaft is attached to a fixed part. In addition, it is sufficient as a coil when the coil suitably generates a magnetic flux from one of the magnetic poles of the core toward the other when energized.

The embodiment disclosed herein is merely an exemplification in every respect and should not be considered as limitative. The scope of the present invention is specified by the claims, not by the above-mentioned description. The scope of the present invention is intended to include all modifications in so far as they are within the scope of the appended claims or the equivalents thereof.

REFERENCE SIGNS LIST

1 Rotary reciprocating drive actuator
10 Movable part
11 Rotating shaft
12 Mirror part (movable object)
20 Fixed part
21 Base
211 Left side wall part (second support)
212 Right side wall part (third support)
22 Second bearing
23 Third bearing
30 Driving part
31 Core unit
32 Magnet
41, 42 First core (core)
43 Second core (core)
44, 45 Coil
48 Rotation angle position holding part
51 First shield member (first support)
52 Second shield member
53 First bearing
A Optical scanning device

The invention claimed is:
1. A rotary reciprocating drive actuator, comprising:
a movable part including a rotating shaft on which a movable object is disposed;
a fixed part configured to support the rotating shaft; and
a driving part configured to rotate the rotating shaft about an axis of the rotating shaft with respect to the fixed part by utilizing electromagnetic interaction, the driving part including a coil and a core each disposed on the fixed part, and a magnet disposed on the rotating shaft, wherein
the magnet is a ring-shaped magnet such that an S pole and an N pole are alternately disposed on an outer peripheral surface of the magnet in a circumferential direction of the magnet,
the core includes one or more magnetic pole parts that are excited to generate a polarity by energizing the coil, and the core is disposed in such a way that the one or more magnetic pole parts face the outer peripheral surface of the magnet via an air gap when the rotating shaft is attached to the fixed part, and the number of one or more magnetic poles of the magnet is equal to the number of the one or more magnetic pole parts, and wherein the rotary reciprocating drive actuator further includes a rotation angle position holding part configured to hold a rotation angle position of the rotation shaft at a neutral position by a magnetic attraction force generated between the magnet and the rotation angle position holding part, the rotation angle position holding part being disposed on the fixed part so as to face the magnet via the air gap, and wherein the fixed part includes a first support and a second support disposed so as to face each other with the magnet therebetween in a direction of the axis, the rotating shaft is rotatably attached to the first support via the first bearing and to the second support via the second bearing, and one of the first bearing or the second bearing is a rolling bearing, and the other of the first bearing or the second bearing is a slide bearing.

2. The rotary reciprocating drive actuator according to claim 1, wherein:
the first bearing is the slide bearing; and
the second bearing is the rolling bearing.

3. The rotary reciprocating drive actuator according to claim 2, wherein,
the first bearing includes: a cylindrical body part through which the rotating shaft is inserted; and a flange part disposed at an end of the cylindrical body part, and wherein
the cylindrical body part is fitted into a bearing attaching part formed in the first support, and the flange part is locked to an outer surface of the first support.

4. The rotary reciprocating drive actuator according to claim 3, wherein:
the first bearing is a resin molded product.

5. The rotary reciprocating drive actuator according to claim 4, wherein:
the first bearing is made of a fluororesin.

6. The rotary reciprocating drive actuator according to claim 1, wherein:
the magnet is a two-pole magnet; and
when the magnet is held at the neutral position, two magnetic pole switching parts of the magnet face the one or more magnetic pole parts.

7. The rotary reciprocating drive actuator according to claim 1, wherein:
a shield member made of an electric conductive material is disposed on at least one side of the core unit in the direction of the axis, the core unit including the core and the coil.

8. The rotary reciprocating drive actuator according to claim 7, wherein:
the first support is composed of the shield member.

9. The rotary reciprocating drive actuator according to claim 7, wherein:
the shield member is made of an aluminum alloy.

10. The rotary reciprocating drive actuator according to claim 1, wherein:
the movable object is a mirror that reflects scanning light.

11. A rotary reciprocating drive actuator, comprising:
a movable part including a rotating shaft on which a movable object is disposed;
a fixed part configured to support the rotating shaft; and
a driving part configured to rotate the rotating shaft about an axis of the rotating shaft with respect to the fixed part by utilizing electromagnetic interaction, the driving part including a coil and a core each disposed on the fixed part, and a magnet disposed on the rotating shaft, wherein the magnet is a ring-shaped magnet such that an S pole and an N pole are alternately disposed on an outer peripheral surface of the magnet in a circumferential direction of the magnet, the core includes one or more magnetic pole parts that are excited to generate a polarity by energizing the coil, and the core is disposed in such a way that the one or more magnetic pole parts face the outer peripheral surface of the magnet via an air gap when the rotating shaft is attached to the fixed part, and the number of one or more magnetic poles of the magnet is equal to the number of the one or more magnetic pole parts, and wherein the rotary reciprocating drive actuator further includes a rotation angle position holding part configured to hold a rotation angle position of the rotation shaft at a neutral position by a magnetic attraction force generated between the magnet and the rotation angle position holding part, the rotation angle position holding part being disposed on the fixed part so as to face the magnet via the air gap, and wherein the fixed part includes a first support and a second support disposed so as to face each other with the magnet therebetween in a direction of the axis, and includes a third support disposed so as to face the second support with the movable object therebetween, and the rotating shaft is rotatably supported at three locations that are respectively in the first support, the second support, and the third support.

12. The rotary reciprocating drive actuator according to claim 11, wherein:
the rotating shaft is rotatably attached to the first support via the first bearing, to the second support via the second bearing, and to the third support via the third bearing;
the first bearing is a slide bearing; and
the second bearing and the third bearing are rolling bearings.

13. The rotary reciprocating drive actuator according to claim 11, wherein:
the rotating shaft is rotatably attached to the first support via the first bearing, to the second support via the second bearing, and to the third support via the third bearing;
the first bearing, the second bearing, and the third bearing are rolling bearings.

14. The rotary reciprocating drive actuator according to claim 11, wherein:
the magnet is a two-pole magnet; and
when the magnet is held at the neutral position, two magnetic pole switching parts of the magnet face the one or more magnetic pole parts.

15. The rotary reciprocating drive actuator according to claim 11, wherein:
a shield member made of an electric conductive material is disposed on at least one side of the core unit in the direction of the axis, the core unit including the core and the coil.

16. The rotary reciprocating drive actuator according to claim 15, wherein:
the first support is composed of the shield member.

17. The rotary reciprocating drive actuator according to claim 15, wherein:
the shield member is made of an aluminum alloy.

18. The rotary reciprocating drive actuator according to claim 11, wherein:
the movable object is a mirror that reflects scanning light.

* * * * *